United States Patent [19]
Ito

[11] Patent Number: 5,905,849
[45] Date of Patent: May 18, 1999

[54] UNDERWATER HEATER FOR AQUARIUM

[75] Inventor: Masahiko Ito, Neyagawa, Japan

[73] Assignee: Sanritsu Electric Co., Ltd., Osaka, Japan

[21] Appl. No.: 08/972,169

[22] Filed: Nov. 17, 1997

[30] Foreign Application Priority Data

Nov. 27, 1996 [JP] Japan .................................. 8-332937

[51] Int. Cl.⁶ .................................................... H05B 1/02
[52] U.S. Cl. ......................................... 392/498; 219/523
[58] Field of Search ................................... 392/498, 451, 392/447, 448, 385; 219/251, 257, 258, 523, 494; 361/59, 103, 106

[56] References Cited

U.S. PATENT DOCUMENTS

| | | | |
|---|---|---|---|
| 1,981,251 | 2/1934 | Roth | 219/494 |
| 1,992,635 | 2/1935 | Ritterhoff et al. | 392/313 |
| 2,839,660 | 7/1958 | Davies | 219/534 |
| 3,107,289 | 10/1963 | Willinger | 219/489 |
| 3,107,290 | 10/1963 | Willinger | 219/494 |
| 3,746,836 | 7/1973 | Summerfield et al. | 392/498 |
| 3,796,858 | 3/1974 | Cohn | 219/331 |
| 3,803,386 | 4/1974 | Rodrigues | 219/523 |
| 3,895,217 | 7/1975 | Hall et al. | 219/523 |
| 4,021,643 | 5/1977 | Hall et al. | 219/523 |
| 4,037,080 | 7/1977 | Owen | 219/481 |
| 4,072,847 | 2/1978 | Craven | 219/523 |
| 4,327,281 | 4/1982 | Jager et al. | 219/523 |
| 4,379,220 | 4/1983 | Middleman et al. | 392/497 |
| 5,054,136 | 10/1991 | Inagaki | 4/546 |
| 5,079,409 | 1/1992 | Takada et al. | 219/497 |
| 5,092,519 | 3/1992 | Staats | 236/21 B |
| 5,113,057 | 5/1992 | Tsai | 219/523 |
| 5,392,380 | 2/1995 | Tsai | 392/498 |
| 5,442,157 | 8/1995 | Jackson | 219/492 |
| 5,465,014 | 11/1995 | Avvisati | 307/117 |
| 5,506,391 | 4/1996 | Burayez et al. | 219/772 |
| 5,550,526 | 8/1996 | Mottahed | 338/22 R |
| 5,597,335 | 1/1997 | Woodland | 441/36 |
| 5,600,528 | 2/1997 | McQueen | 361/103 |

FOREIGN PATENT DOCUMENTS

| | | |
|---|---|---|
| 59-117682 | 8/1984 | Japan . |
| 60-115492 | 8/1985 | Japan . |

Primary Examiner—Teresa Walberg
Assistant Examiner—Vinod D Patel
Attorney, Agent, or Firm—Jordan and Hamburg LLP

[57] ABSTRACT

An underwater heater for warming water in an aquarium comprises a thermal sensor for sensing temperature of a main heater body and a control unit for controlling operation of the main heater body via reception of a detect signal output from the thermal sensor. In addition to a switch device for opening and closing a power-supply circuit for supplying power to the main heater body, the control unit further comprises a drive circuit, an abnormality-detection circuit, and a memory circuit. Whenever the abnormality-detection circuit detects that the thermal sensor has detected an abnormal temperature, the drive circuit activates the switch device to open itself to cause power supply to the main heater body to be shut off and to simultaneously cause the memory circuit to store the abnormality-detected condition therein. The memory storing condition is reset via a resetting operation effected by pulling a power-supply plug out from a power-outlet socket to enable to main heater body to effect the resetting operation.

9 Claims, 11 Drawing Sheets

UNDERWATER HEATER FOR AQUARIUM

FIELD OF THE INVENTION

The present invention relates to an underwater heater usable for an aquarium for viewing appreciative fishes such as tropical fishes and underwater plants such as algae. More particularly, the invention relates to an underwater heater usable for warming water filled in said aquarium.

BACKGROUND ART

Generally, any conventional underwater heater usable for an aquarium uses a main heater body comprising a heat-resistant cylindrical tube internally storing a heating member such as a nichrome wire, a thermal sensor such as a thermistor for detecting water temperature inside of an aquarium, and a parts-mounting substrate for controlling power delivered to the heating member. If water temperature detected by the thermal sensor remains below a predetermined degree, power is fed to the heating member to activate heating operation to raise water temperature therein, whereas if water temperature detected by the thermal sensor exceeds the predetermined degree, power is shut off from the heating member to halt heating operation so that water temperature inside of the aquarium can be lowered.

Nevertheless, if the underwater heater were erroneously operated outside of an aquarium or exposed above water surface caused by decreased water therein during heating operation, the heating member enters into overheating condition to generate abnormally high temperature which can eventually cause fire to break out.

If the aquarium ever overturns as a result of earthquake for example, water flows out of the aquarium causing the heater member to be exposed externally resulting the heating member overheating as discussed above case to which may cause fire to break out.

To deal with the above problem, there is proposed an non-resettable system having a thermal fuse connected to the heating member in series so that the thermal fuse melted whenever the heating member enters into an overheating condition. The thermal fuse cannot return to its original state. Likewise, a resettable system is also known, which is provided with a device of a thermal fuse for controlling operation feeding power to the heating member. If the heating member ever generates abnormally high temperature after entering into an overheated condition, power is shut off via the bimetal device, and after the temperature is lowered, power supply to the heating member is automatically restored.

Nevertheless, according to the former non-resettable system, the heater itself is no longer usable after melting the thermal fuse, and thus, the heater must be scrapped which is wasteful.

According to the latter resettable system, the heater itself is repeatedly usable. But the temperature is raised and lowered repeatedly via the bimetal device, and accordingly it will induce fire to break out as time passes by.

SUMMARY OF THE INVENTION

The object of the invention is to provide an underwater heater usable for an aquarium, which is repeatedly usable and capable of securely preventing fire from being generated by overheating.

To achieve the above object, the invention provides an underwater heater for an aquarium incorporating a main heater body which comprises an electrical heater member and a power supply circuit for heating the electrical heater member with the following; a thermal sensor for sensing temperature of the main heater body, and a control unit for controlling operation of the main heater body by way of receiving a detection signal output from the thermal sensor. The control unit comprises an opening/closing means for opening and closing the power-supply circuit of the main heater body, an abnormality-detecting circuit for causing the thermal sensor to detect that an abnormal temperature is reached, a drive circuit for causing the opening/closing means to execute opening operation in response to abnormality detected by the abnormality-detecting circuit, and a memory circuit for storing the detection signal output from the abnormality-detecting circuit. The memory circuit is structured in order that a normal state without detectable abnormality is restored by way of releasing a memory-storing condition.

According to the above structure, in the event that the main heater body is carelessly operated outside of an aquarium or exposed above water surface resulting in the heater member overheating the abnormality-detecting circuit detects abnormality of the main heater body via the thermal sensor that senses temperature of the main heater body to simultaneously cause the drive circuit responding to the detected abnormality to cause the opening/closing means to activate an opening operation, thus causing power supplied to the electrical heating member to be shut off.

Also, responding to the above abnormality detected by the abnormality-detecting circuit, the memory circuit stores the abnormality-detected condition to maintain the power-shutoff condition. Then, after effecting a resetting operation, the memory storing condition is released to cause the opening/closing means to activate a closing operation to resume operation to feed power to the electrical heating member.

Accordingly, even when the main heater body is carelessly operated outside of the aquarium, there is no fear of causing the electrical heating member to run into overheating condition resulting in the generation of abnormally high temperature, and thus, fire can be prevented from breaking out, and yet, owing to the resetting operation, the main heater body can repeatedly be used to provide economical advantage.

Further, according to the invention a memory storing condition of the memory circuit is released by operating a reset switch to make it possible to reset the memory via a simple operation, and thus, the resetting operation can quickly be implemented.

DETAILED DESCRIPTION OF THE INVENTION

Figure 1:
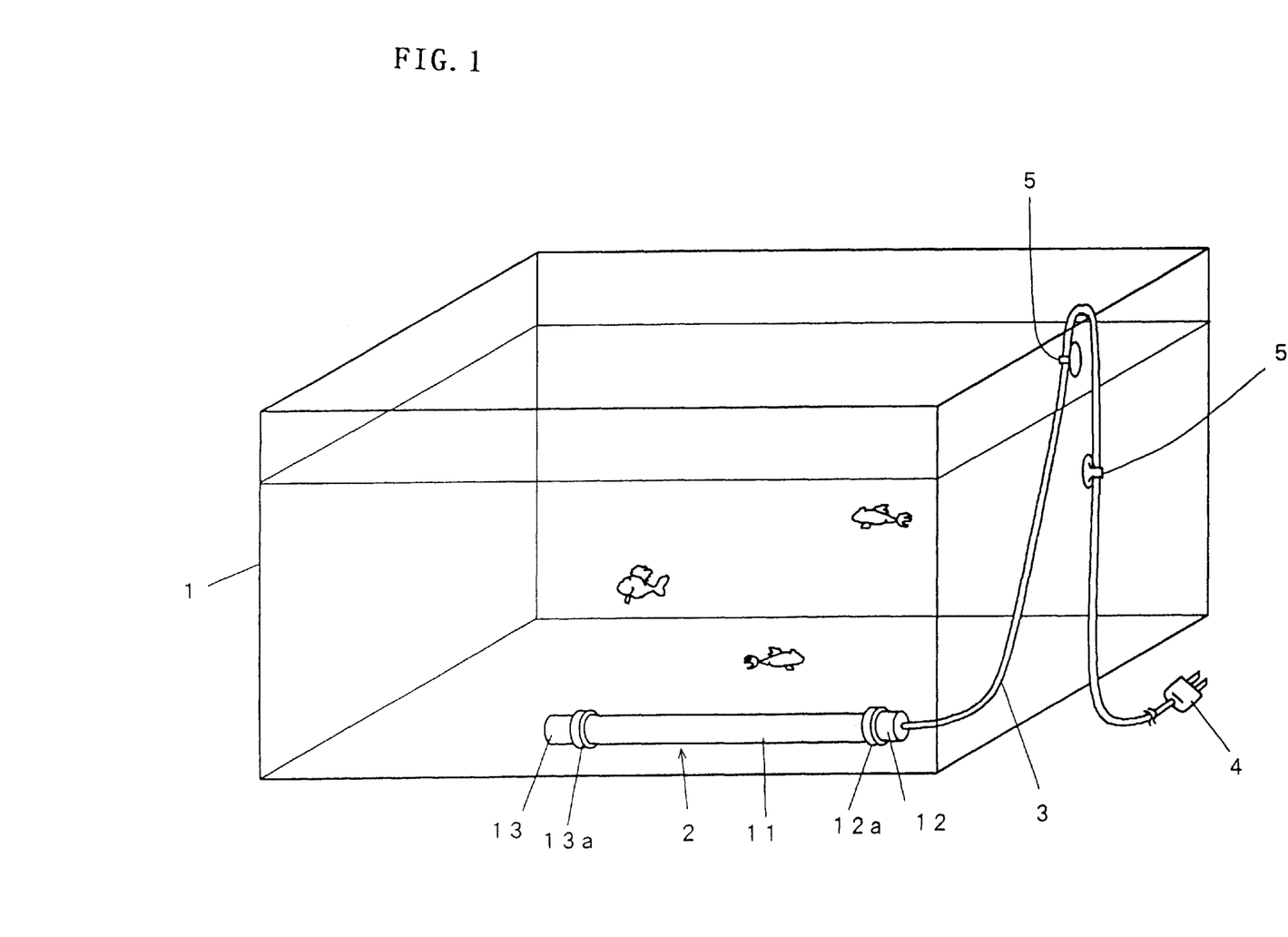
FIG. 1 is a perspective view of an underwater heater for an aquarium according to a first embodiment of the invention showing use in the aquarium.

FIG. 1 represents an underwater heater according to a first embodiment of the invention being used in an appreciative aquarium.

Reference numeral 1 shown in FIG. 1 designates an aquarium filled with water. A main heater body 2 is secured onto internal bottom plane of the aquarium 1. A power-supply cord 3 is drawn out of the main heater body 2. A power-supply plug 4 is secured to the tip of the power-supply cord 3, which is inserted inside of a power-outlet socket for supplying commercially available 100 VAC power for example. A pair of acetabula 5 and 5 are transferably set above the power-supply cord 3 so that the main heater body 2 and the power-supply cord 3 can be secured by causing the acetabula 5 to be held onto an internal or external wall surface of the aquarium 1.

As shown in the aquarium 1, fishes like tropical fishes are accommodated. However, not only fishes, but any underwater animal or plant such as algae may also be accommodated.

Figure 2:
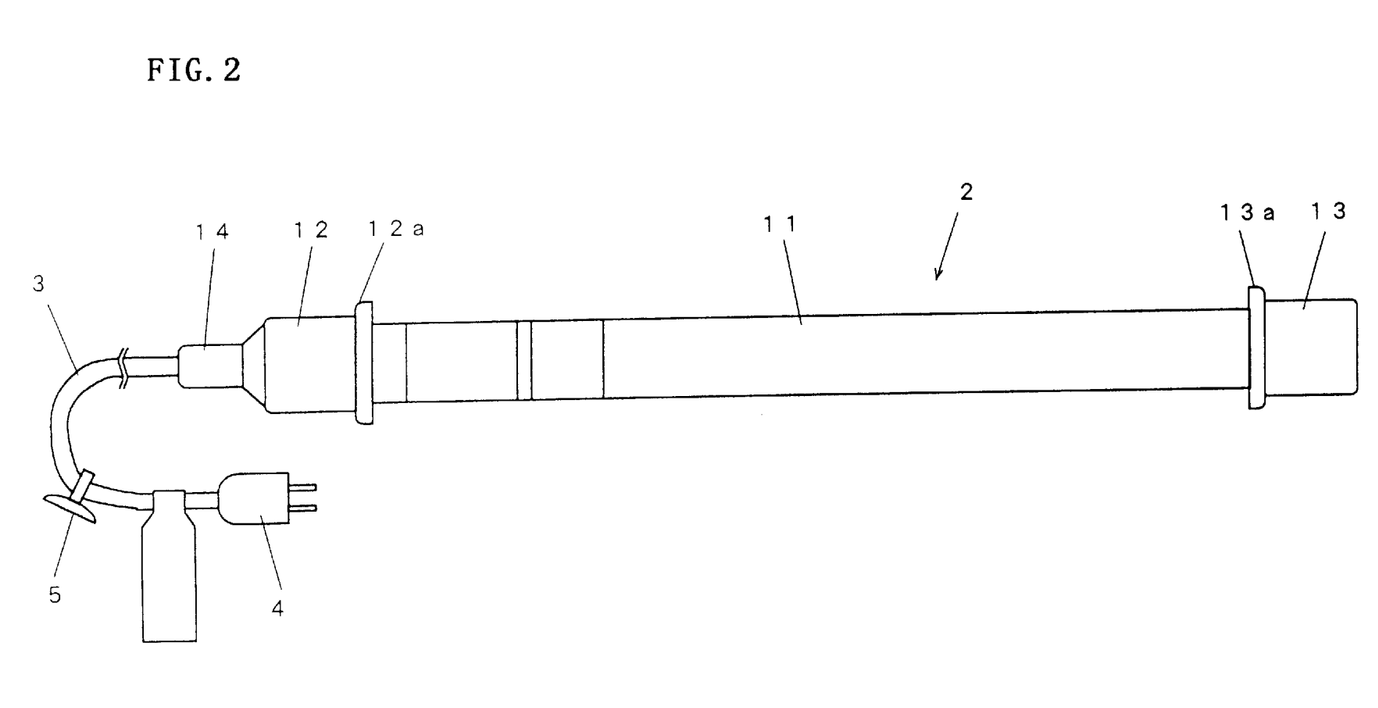
FIG. 2 is a front view showing a whole structure of the first embodiment of the invention.

As shown in FIG. 2, both ends of a cylindrical tube 11 of the main heater body 2 are covered with rubber caps 12 and 13. A stress relief member 14 for externally drawing out the power-supply cord 3 is integrally formed in conjunction with the rubber cap 12. The rubber caps 12 and 13 are individually provided with a flange member 12a and 13a. When the main heater body 2 is horizontally secured onto internal bottom plane of the aquarium 1, external circumferential surface of the cylindrical tube 11 is prevented from directly being brought into contact with the bottom surface of the aquarium 1.

Figure 3:
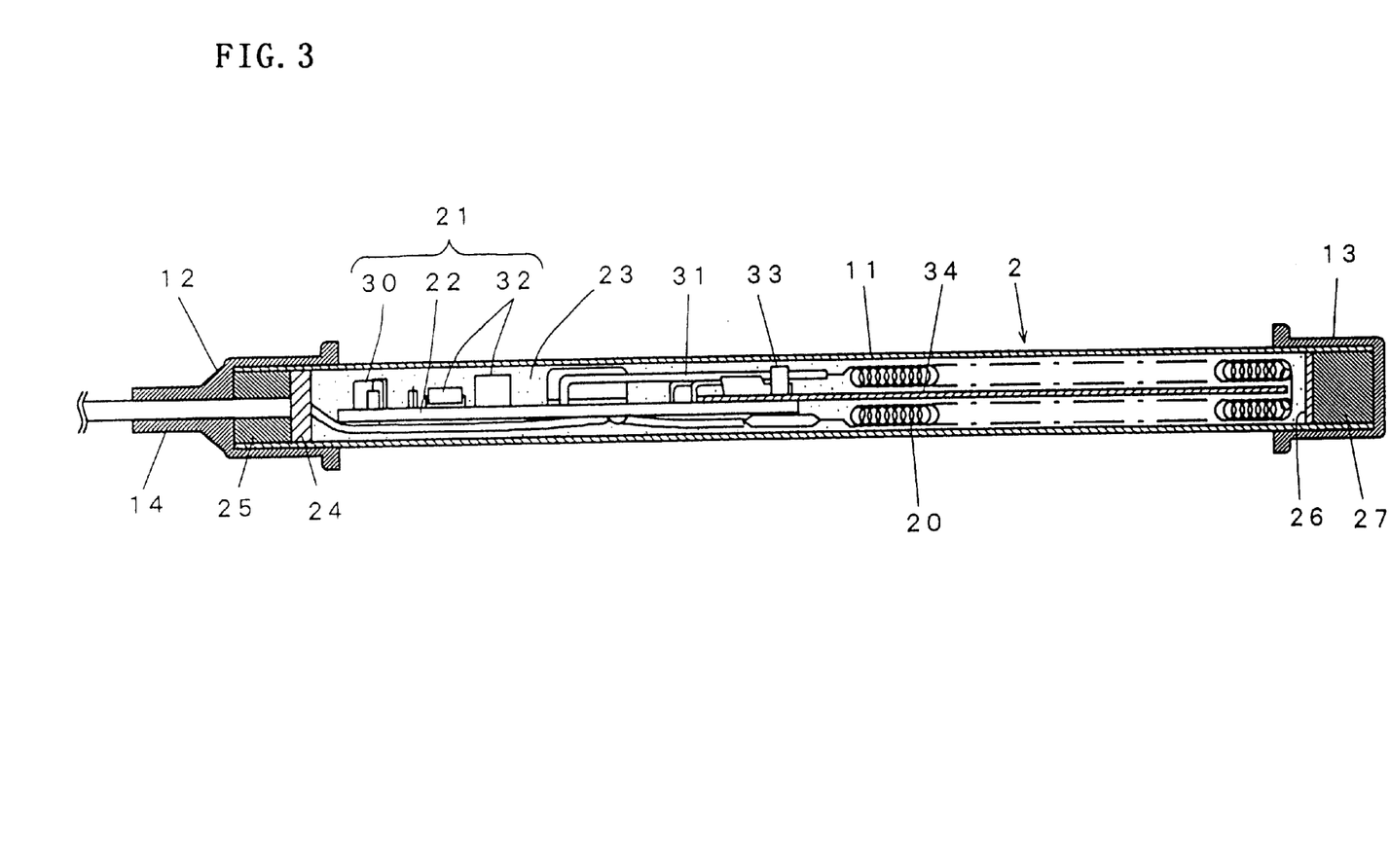
FIG. 3 is a vertical sectional view showing an internal structure of the main heater body of a first embodiment.

A heat-resistant opaque ceramic tube makes up the cylindrical tube 11. As shown in FIG. 3, internal space of the cylindrical tube 11 accommodates a continuous electrical heating member 20 composed of a nichrome wire and a parts-mounting substrate 21 used for mounting a number of electrical parts thereon respectively sharing the left and right portions, and yet, open internal space of the cylindrical tube 11 is filled with filler 23 comprising powdered magnesia so that thermal conductivity is promoted.

Both ends of the cylindrical tube 11 are open. A rubber packing 24 and a silicone seal 25 are inserted in an aperture end, whereas a ceramic paper 26 and a silicone seal 27 are inserted in the other aperture end. By way of externally securing the rubber caps 12 and 13 onto external surface of the corresponding aperture ends, water-tight structure is completed.

The parts-mounting substrate 21 comprises a printed circuit board which accommodates a thermistor 30 functioning as a sensor for detecting water temperature, a lead wire 31, and a variety of circuit components 32 such as resistors, capacitors, ICs composing a control unit 40 to be described later on. In addition, the printed circuit board 22 is further provided with a thermistor 33 functioning as a thermal sensor for detecting an abnormally raised temperature of the main heater body 2 whenever blank heating is generated, where the thermistor 33 is positioned in the periphery of the electrical heating member 20.

The electrical heating member 20 is stored inside of the cylindrical tube 11 folded in a U-shape around a mica plate 34 that serves as a thermal insulator.

Figure 4:
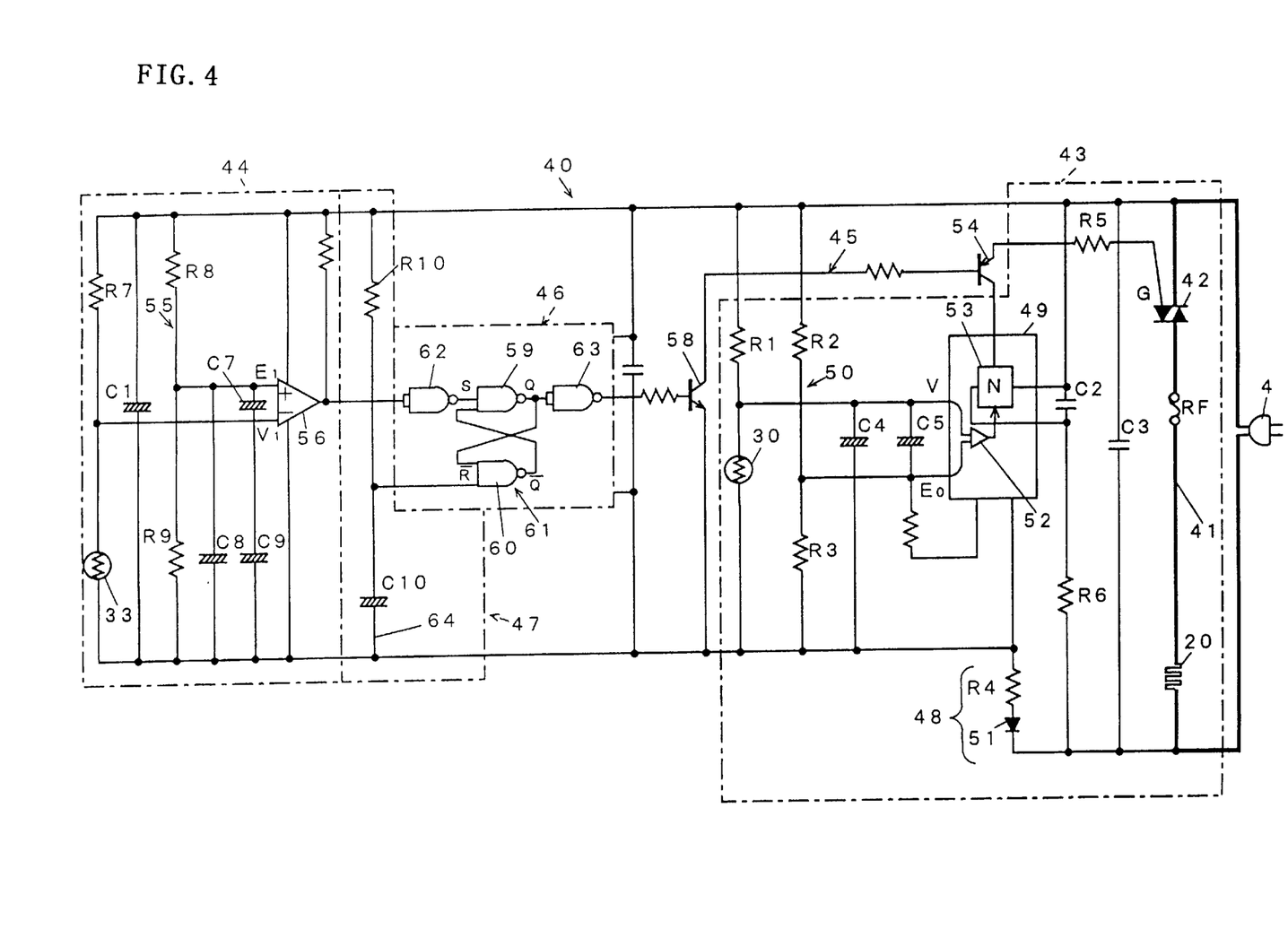
FIG. 4 is a schematic block diagram of an electrical circuit of a control unit of the first embodiment.

Referring to FIG. 4, there is shown a circuit of the control controlling operation of the main heater body 2. The control unit 40 comprises the following: a water-temperature control circuit 43 including a semiconductor switch 42 for opening and closing a power-supply circuit 41 that feeds power to the main heater body 2; an abnormality-detecting circuit 44 for detecting via detect signal output from the thermal sensor 33 that temperature of the main heater body 2 has reached an abnormally high degree; a drive circuit 45 for causing the semiconductor switch 42 to be turned OFF in response to abnormality-detect signal detected by the abnormality-detecting circuit 44; a memory circuit 46 for storing abnormality-detected condition; and a resetting circuit 47 for causing the memory circuit 46 to release memory-storing condition to activate retrieving operation. Power is supplied to the control unit 40 via the power-supply plug 4 inserted in a commercially available power-outlet socket.

The power-supply circuit 41 incorporates the electrical heating member 20, the semiconductor switch 42 functioning as a means for opening and closing the power-supply circuit 41, and a fuse resistor (temperature fuse) RF. In this embodiment, a triode AC switch is used to serve as the semiconductor switch 42.

The water-temperature control circuit 43 includes a power circuit 48 for feeding DC voltage, an IC-control circuit 49, and a reference-voltage setting circuit 50.

The power circuit 48 comprises a half-wave rectifying diode 51, a resistor R4, and a smoothing capacitor C1, with which AC power voltage received via the power-supply plug 4 is converted into DC voltage.

The IC-control circuit 49 includes a comparator 52 and a zero-cross control circuit 53. The comparator 52 compares input voltage V with reference voltage $E_0$, and then outputs comparative value to the zero-cross control circuit 53. Voltage divided by the thermistor 30, which is a negative resistor element and the resistor R1 is delivered to the comparator 52 as the input voltage V. On the other hand, voltage divided by resistor R2 and resistor R3 of the reference-voltage setting circuit 50 is delivered to the comparator 52 as the reference voltage $E_0$. When water temperature stored in the aquarium 1 is below a predetermined degree (26° C. for example), input voltage V overgrows becomes greater than the reference voltage $E_0$, whereas if water temperature exceeds a predetermined degree, input voltage V becomes smaller than the reference voltage $E_0$ causing comparative value output from the comparator 52 to be inverted.

The zero-cross control circuit 53 delivers gate signal to gate G of the semiconductor switch 42 via transistor 54 and resistor R5 of the drive circuit 45. In order to suppress generation of noise, the zero-cross control circuit 53 generates gate signal based on zero-cross timing of AC power voltage and then outputs the gate signal to the semiconductor switch 42.

A series circuit formed by capacitor C2 and resistor R6 shown in FIG. 4 transmits zero-cross timing to the zero-cross control circuit 53 and sets a pulse width of gate signal.

Capacitors C3–C5 shown in FIG. 4 are used for cutting noise. The abnormality-detecting circuit 44 includes a reference-voltage setting circuit 55 and a comparator 56 for detecting abnormal temperature. The comparator 56 makes comparison between input voltage V1 and reference voltage E1, and then outputs comparative value to the memory circuit 46. Voltage divided by the thermistor 33, which is a negative resistor element, and the resistor R7 of the reference voltage setting 55 is delivered to the comparator 56 as the input voltage V1, whereas voltage divided by the resistor R8 and the resistor R9 of the reference-voltage setting circuit 55 is delivered to the comparator 56 as the reference voltage E1.

While temperature of the main heater body 2 remains below a predetermined degree (55°–60° C. for example), the input voltage V1 is greater than the reference voltage E1, and accordingly, theoretical level of comparative value output from the comparator 56 becomes LOW (hereinafter merely being expressed as "L"). When the main heater body 2 reaches an abnormally high temperature exceeding a predetermined degree, the input voltage V1 becomes smaller than the reference voltage E1, and accordingly, the comparative value output from the comparator 56 is inverted to turn theoretical level to be HIGH ("H").

Capacitors C7–C9 shown in FIG. 4 are used to cut off noise.

The drive circuit 45 incorporates a transistor 58 switchable to ON/OFF condition in correspondence with comparative value "L" or "H" output from the comparator 56 subsequent to reception of signal output from the memory circuit 46 and a transistor 54 switchable to ON/OFF condition in response to ON/OFF operation of the transistor 58.

The memory circuit 46 incorporates an R-S flip-flop 61 comprising a first NAND circuit 59 and a second NAND circuit 60. Comparative value output from the comparator 56 is delivered to the R-S flip-flop 61 as a setting input (designated as S in FIG. 4) via a NOT circuit 62. Signal Q output from the NAND circuit 59 is delivered to base of the transistor 58 via the NOT circuit 63. The memory circuit 46 stores inversion of input signal from "H" level to "L" level set to the R-S flip-flop 61 as the abnormality-detected state.

The resetting circuit 47 incorporates an integration circuit 64. While the memory circuit 46 stores the state of detected abnormality, shutting off the supply of power to the electrical heating member 20 resets the state of storing the detected abnormality. Power is shut off is released by way of drawing out the power-supply plug 4 from the power-outlet socket to effect the resetting.

The integration circuit 64 comprises a resistor R10 and a capacitor C10, which compulsorily resets the R-S flip-flop 61 at the time of turning power ON. When turning power ON, assume that an effective time until power reaches the control unit 40 is "t1" (approximately 0.1 second) and the time needed for causing reset-input (designated as $\overline{R}$ in FIG. 4) to be inverted from "L" to "H", i.e., delay time determinable by time constant of the resistor R10 and the capacitor C10 of the integration circuit 64 is "t2" (approximately 0.2 second), then timewise the relationship is t2>t1. Accordingly, when the control unit 40 is activated to operate itself, reset-input remains "L", in other words, reset condition is entered to cause the R-S flip-flop 61 to be reset, and then, the reset-input turns to "H" to cause the R-S flip-flop 61 to enter into standby condition.

Next, operations performed via the first embodiment of the invention are described below.

(A) Basic operation for controlling water temperature:

Initially, the main heater body 2 is secured onto bottom plane inside of an aquarium 1, and then the power plug 4 is inserted into a power-outlet socket to feed power to the electrical heating member 20 to cause water filled in the aquarium 1 to be warmed via heating operation of the heating member 20.

As water temperature inside of the aquarium 1 rises, resistance value of the thermistor 30 inside of the water-temperature control circuit 43 diminishes. However, while water temperature inside of the aquarium 1 remains below a predetermined degree, voltage at both ends of the thermistor 30, i.e., input voltage V of the comparator 52 is higher than the reference voltage $E_0$, and thus, the semiconductor switch 42 remains ON to maintain supply of power to the heating member 20.

When water temperature inside of the aquarium 1 ever exceeds a predetermined degree, voltage across the thermistor 30, i.e., voltage V to be fed to the comparator 52 becomes lower than the reference voltage $E_0$ to cause the semiconductor switch 42 to be turned OFF, thus shutting off power-supply to the heating member 20.

Subsequent to discontinued heating operation of the heating member 20, water inside of the aquarium 1 is cooled off. When water temperature is lowered below a predetermined degree, then the semiconductor switch 42 is again turned ON to resume supply of power to the heating member 20 to enable water temperature inside of the aquarium 1 to be held at a predetermined degree.

(B) Operation while the heater remains in normal state:

As temperature of the main heater body 2 rises, resistance value of the thermistor 33 built in the abnormality-detecting circuit 44 diminishes. However, when temperature of the heater 2 remains below a predetermined degree, voltage across the thermistor 33, i.e., input voltage V1 of the comparator 56 is higher than the reference voltage E1, and thus, the comparative value output from the comparator 56 remains "L".

While comparative value output from the comparator 56 remains "L", input signal for setting the R-S flip-flop 61 is held "H" via the NOT circuit 62, whereas output signal Q remains "L". Next, "L" level of output signal Q is inverted to be "H" by the NOT circuit 63 to cause a pair of transistors 58 and 54 of the drive circuit 45 to be turned ON in order to enable the semiconductor switch 42 to be held ON to continue supply of power to the heating member 20.

(C) Operation while the heater remains in abnormal state:

When the main heater body 2 generates abnormally high temperature beyond a predetermined degree by causing the heating member 20 of the main heater body 2 to run into an overheated condition, resistance value of the thermistor 33 built in the abnormality-detecting circuit 44 is extremely lowered to cause the voltage across the thermistor 33, i.e., input voltage V1 of the comparator 56 to become lower than the reference voltage E1. In consequence, comparative value output from the comparator 56 is inverted to be "H".

When abnormality is detected by an abnormality detecting circuit 44, in other words, when comparative value output from the comparator 56 is inverted from "L" to "H", input signal for setting the R-S flip-flop 61 built in the memory circuit 46 is inverted from "H" to "L", whereas output signal Q is inverted from "L" to "H". This condition is held in memory until reset input signal becomes "L".

When signal Q output from the memory circuit 46 becomes "H" to cause signal output from the NOT circuit 63 to be inverted to "L", transistors 58 and 54 built in the drive circuit 45 are turned OFF in order to cause the semiconductor switch 42 to be turned OFF to shut off supply of power to the heating member 20. Accordingly, potential damage caused by overheating of the main heater body 2 can be prevented from occurrence, thus fully preventing fire from breaking out without causing temperature to repeatedly rise and lower.

When resetting the heater 2, the power-supply plug 4 is drawn out of a power-outlet socket and then inserted therein gain to cause the resetting circuit 47 to reset the R-S flip-flop 61. In consequence, the memory circuit 46 is released from the state of retaining an abnormality setting to enable power to be fed to the electrical heating member 20 of the main heater body 2 under control of the control unit 40.

Figure 5:
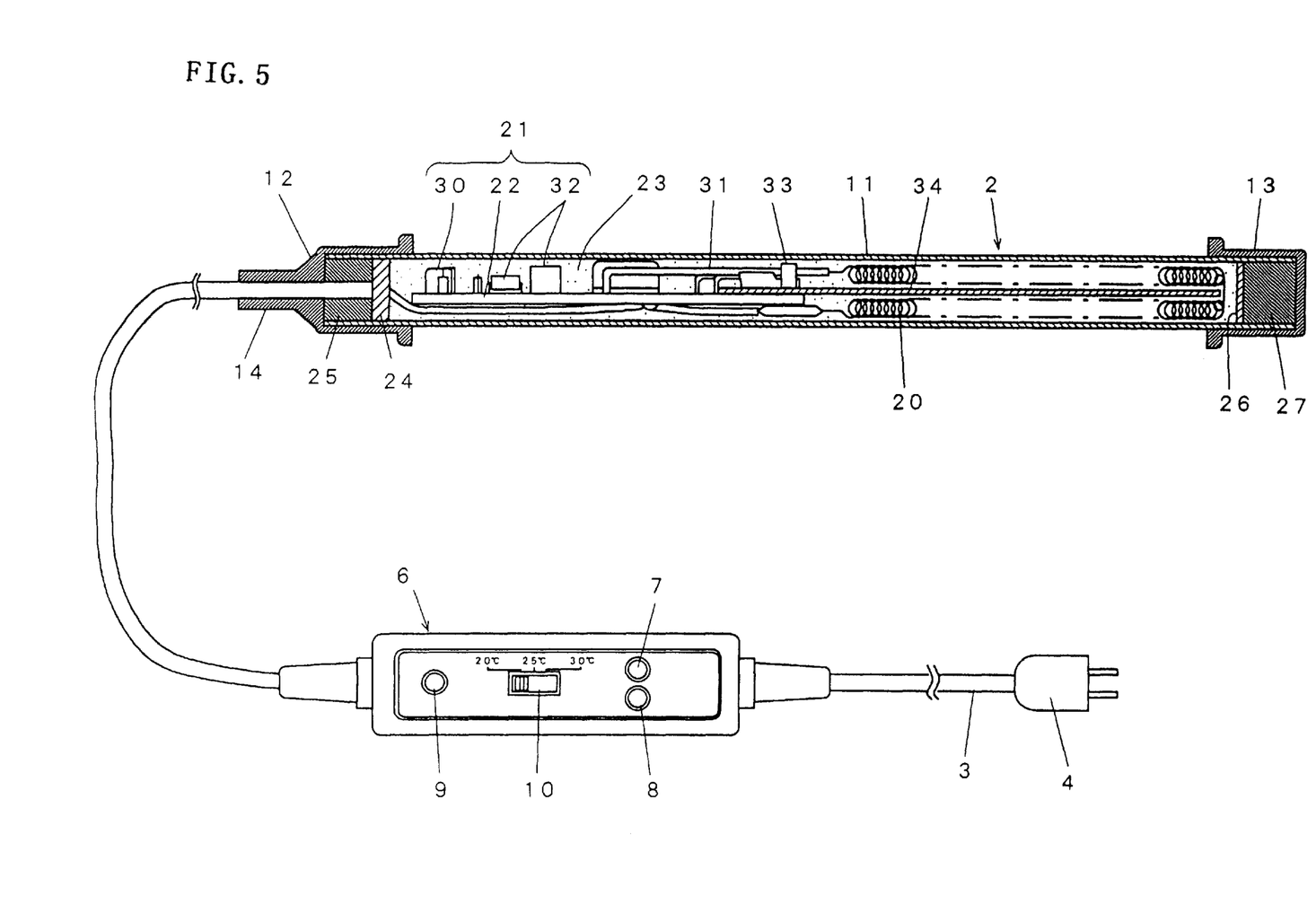
FIG. 5 is a partially exploded front view of an underwater heater for an aquarium according to a second embodiment of the invention.
Figure 6:
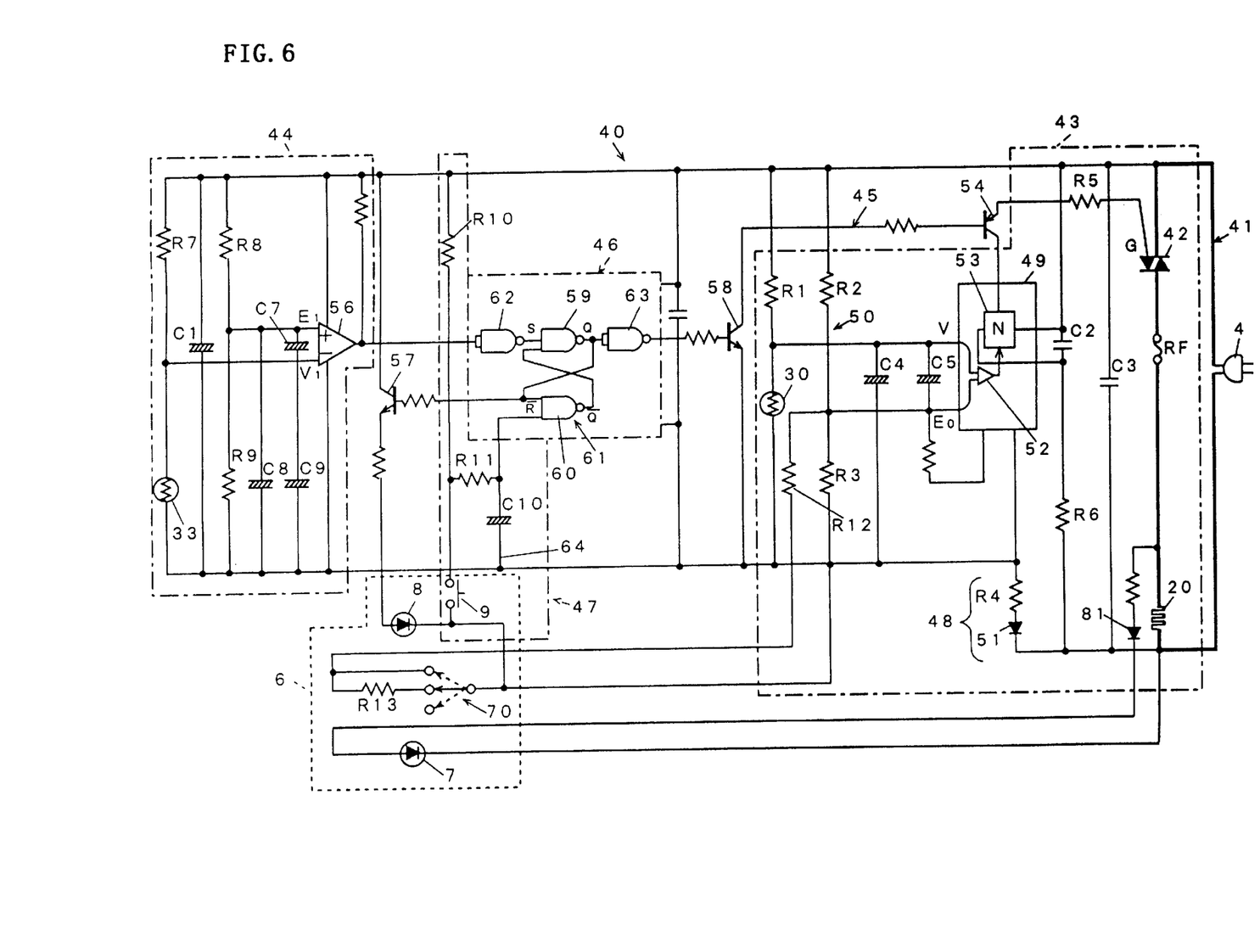
FIG. 6 is a schematic block diagram of an electrical circuit of a control unit of the second embodiment.

FIGS. 5 and 6 respectively exemplify the second embodiment of the invention. FIG. 5 exemplifies a structure of the underwater heater, whereas FIG. 6 exemplifies schematic block diagram of an electrical circuit of the control unit 40. In FIGS. 5 and 6, those components identical or corresponding to those which are used for the first embodiment are designated with identical reference numerals, thus detailed description thereof is omitted.

The reference numeral 6 shown in FIGS. 5 and 6 designates a controller which is set between the main heater body 2 and the power-supply cord 3 interlinking the main heater body 2 and the power-supply plug 4. The controller 6 is attached with a power-ON display element 7 composed of a light-emitting diode, an alarming lamp 8 composed of a light-emitting diode for displaying abnormal condition of the main heater body 2, a reset switch 9 for effecting the resetting operation of the main heater body 2, and an operating unit 10 for operating a water-temperature setting switch 70. The water-temperature setting switch 70 selects connective relationship of resistors R12 and 13 against resistor R3 built in the reference voltage circuit 50. By operating the operating unit 10, water temperature can optionally be set to 26° C., or 28°0 C., or 30° C. for example whichever the one is required.

The resetting circuit 47 incorporates a reset switch 9 for transmitting reset signal to a reset input terminal of the R-S flip-flop 61 via resistor 10, and an integration circuit 64 comprising the resistors R10, R11 and the capacitor C10 described earlier.

The reference numeral 57 shown in FIG. 6 designates a transistor for lighting up the alarming lamp 8 whenever the memory circuit 46 stores the abnormality-detect state. The reference numeral 81 designates a diode for blocking reverse current.

In the second embodiment, among components of the control unit 40, only the power-ON display element 7, alarming lamp 8, reset switch 9, and the temperature-setting switch 70, are built in the controller 6, whereas other components of the control unit 40 are respectively built in the heater body 2.

Next, operation of the heater based on the second embodiment of the invention is described below.

(A) Basic operation for controlling water temperature:

Initially, the heater 2 is set to bottom surface inside of an aquarium 1, whereas the controller 6 is placed at an appropriate location outside of the aquarium 1. Next, by operating the operating unit 10 of the water-temperature setting switch 70 built in the controller 6, desired degree of water temperature is selected. Next, power is fed to the heating member 20 via insertion of the power-supply plug 4 into a power-outlet socket. This causes the heating member 20 to generate heat to warm up water inside of the aquarium 1. When power is ON, the power-ON display element 7 built in the controller 6 lights up to enable viewers to confirm that power is fed to the heating member 20. As was done for the first embodiment, water temperature inside of the aquarium 1 is held at a predetermined degree as per selection via function of the water-temperature control circuit 43.

(B) Operation of the main heater body while remaining in normal state:

Whenever temperature of the main heater body 2 is below the preset degree, comparative value output from the comparator 56 remains "L", and signal Q output from the R-S flipflop 61 also remains "L", and thus, transistor 57 remains OFF, whereas a pair of transistors 58 and 54 built in the drive circuit 45 respectively remain ON to enable power to be fed to the heating member 20 continuously via the semi-conductor switch 42. While this condition is underway, the transistor 57 remains OFF, and thus, the alarming lamp 8 in the controller 6 also remains OFF.

(C) Operation of the heater when abnormal state is generated:

If the heater 2 generates an abnormally high temperature as a result of overheating took place with the heating member 20 of the, as was done for the first embodiment, an abnormal condition is detected by the abnormality-detecting circuit 44 which turns the semi-conductor switch 42 OFF to shut off supply of power to the heating member 20. In this case, input signal for setting R-S flip-flop 61 is inverted from "H" to "L", whereas output signal Q is inverted from "L" to "H" to cause the memory circuit 46 to store the abnormality-detect condition, in other words, it stores the condition in which supply of power to the heating member 20 has been shut off. And when output signal Q from the R-S flip-flop 61 is inverted to be "H", the transistor 57 is turned ON to light up the alarming lamp 8 to enable viewers to confirm that abnormal has been generated.

In order to reset operation of the main heater body 2, the reset switch 9 built in the retrieving circuit 47 is turned ON. As a result, a reset signal is transmitted to the R-S flip-flop 61 to cause the reset input signal to become "L" to release the memory circuit 46 from the state of storing the abnormality, thus enabling resumption of power supply to the heating member 20.

As was done for the first embodiment, at the moment of feeding power, the integration circuit 64 compulsorily resets the R-S flip-flop 61 before the R-S flip-flop 61 is set to standby condition.

According to the second embodiment, provision of the reset switch 9 facilitates reset operation, and yet, water temperature can variably be set via the controller 6, and in addition, actual operating condition can be accessed. Further, now that a majority of components of the control unit 40 are set inside of the main heater body 2 except for the provision of the power-ON display element 7, alarming lamp 8, reset switch 9, and the water-temperature setting switch 70, which are respectively stored inside of the controller 6, size of the controller 6 is compact.

Figure 7:
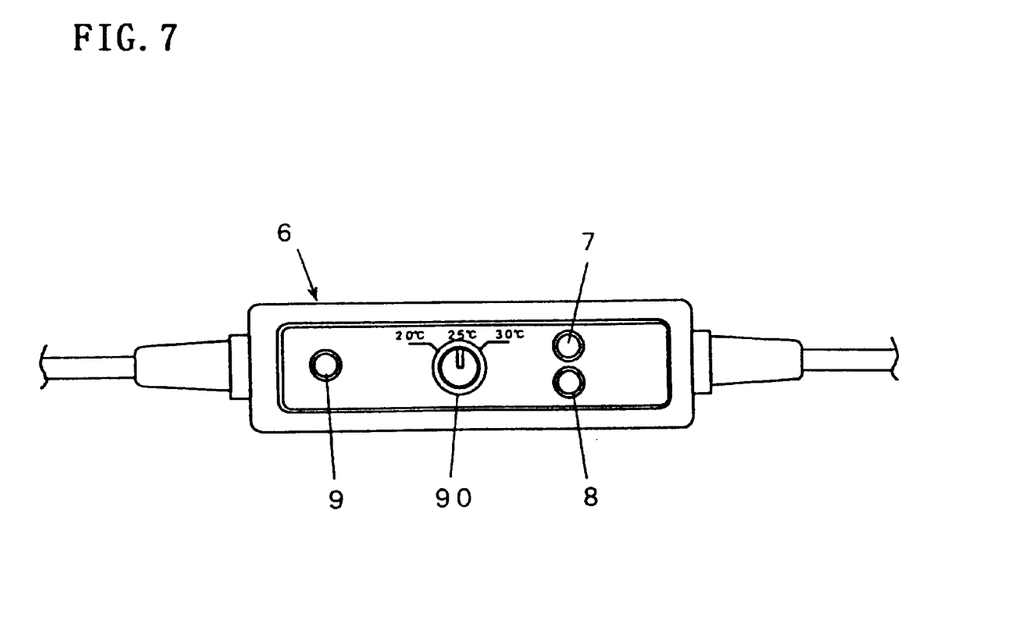
FIG. 7 is a front view of a controller of an underwater heater according to a third embodiment.
Figure 8:
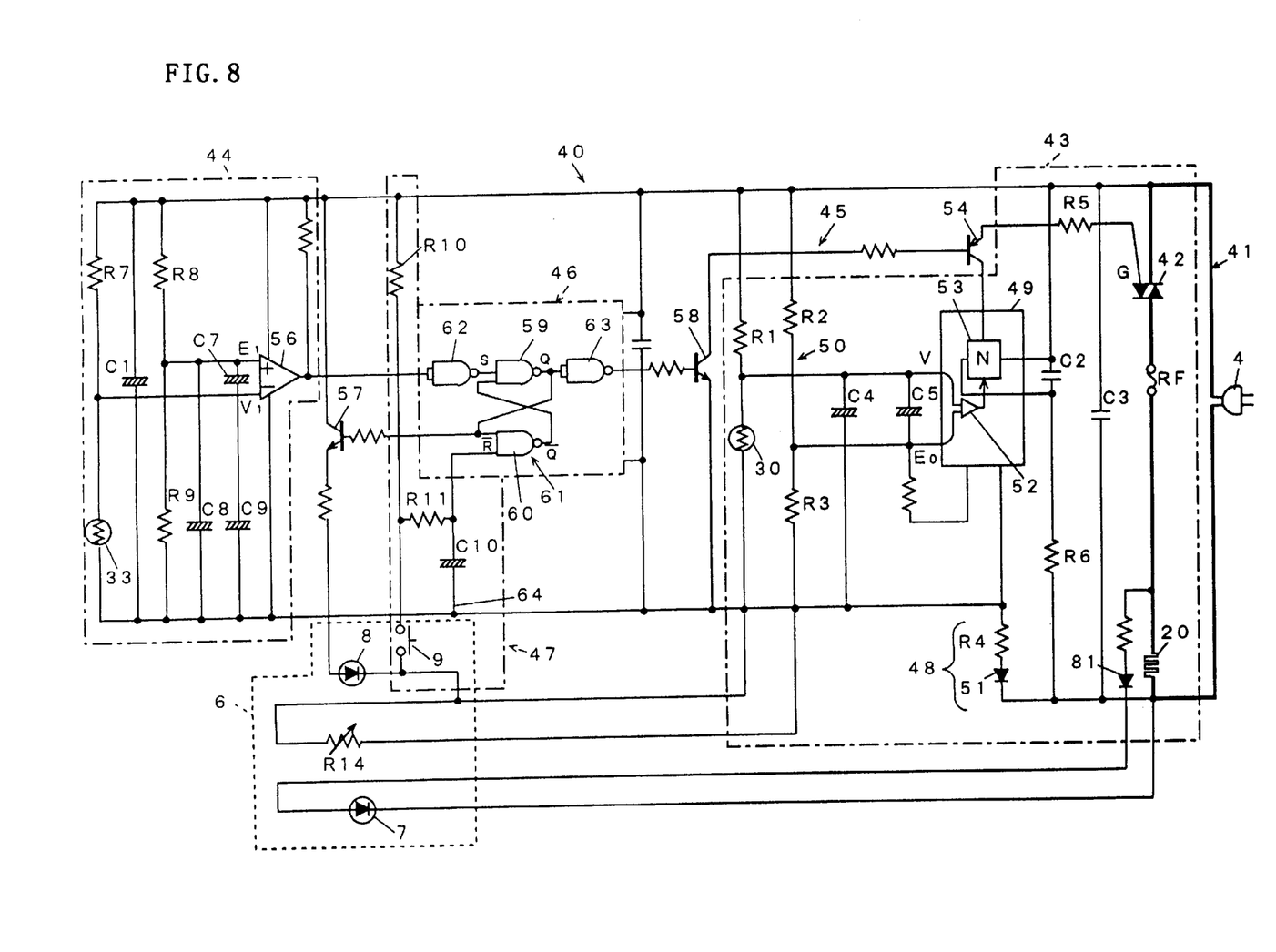
FIG. 8 is a schematic block diagram of an electrical circuit of a control unit of the third embodiment.

FIGS. 7 and 8 respectively exemplify the third embodiment of the invention. FIG. 7 exemplifies structure of the controller 6, whereas FIG. 8 exemplifies schematic block diagram of electrical circuits of the control unit 40. In FIGS. 7 and 8, those components identical or corresponding to those which are used for the first and second embodiments are respectively designated by identical reference numerals and detailed description thereof is omitted.

As a means for variably setting water temperature, the third embodiment uses a variable resistor R14 which is connected in series to resistor 30 of the reference-voltage circuit 50. The variable resistor R14 can be operated via an operating knob 90 provided for the controller 6. Concretely, by way of varying resistance value of the variable resistor R14 via the operating knob 90, water temperature inside of the aquarium 1 can be set to an optional degree within a proper temperature range (between 15° C.–35° C. for example).

In the same way as was done for the second embodiment, the third embodiment has also realized down-sizing of the controller 6 by way of storing only the power-ON display element 7, alarming lamp 8, reset switch 9, and the variable resistor R14 for setting water temperature, inside of the controller 6.

Figure 9:
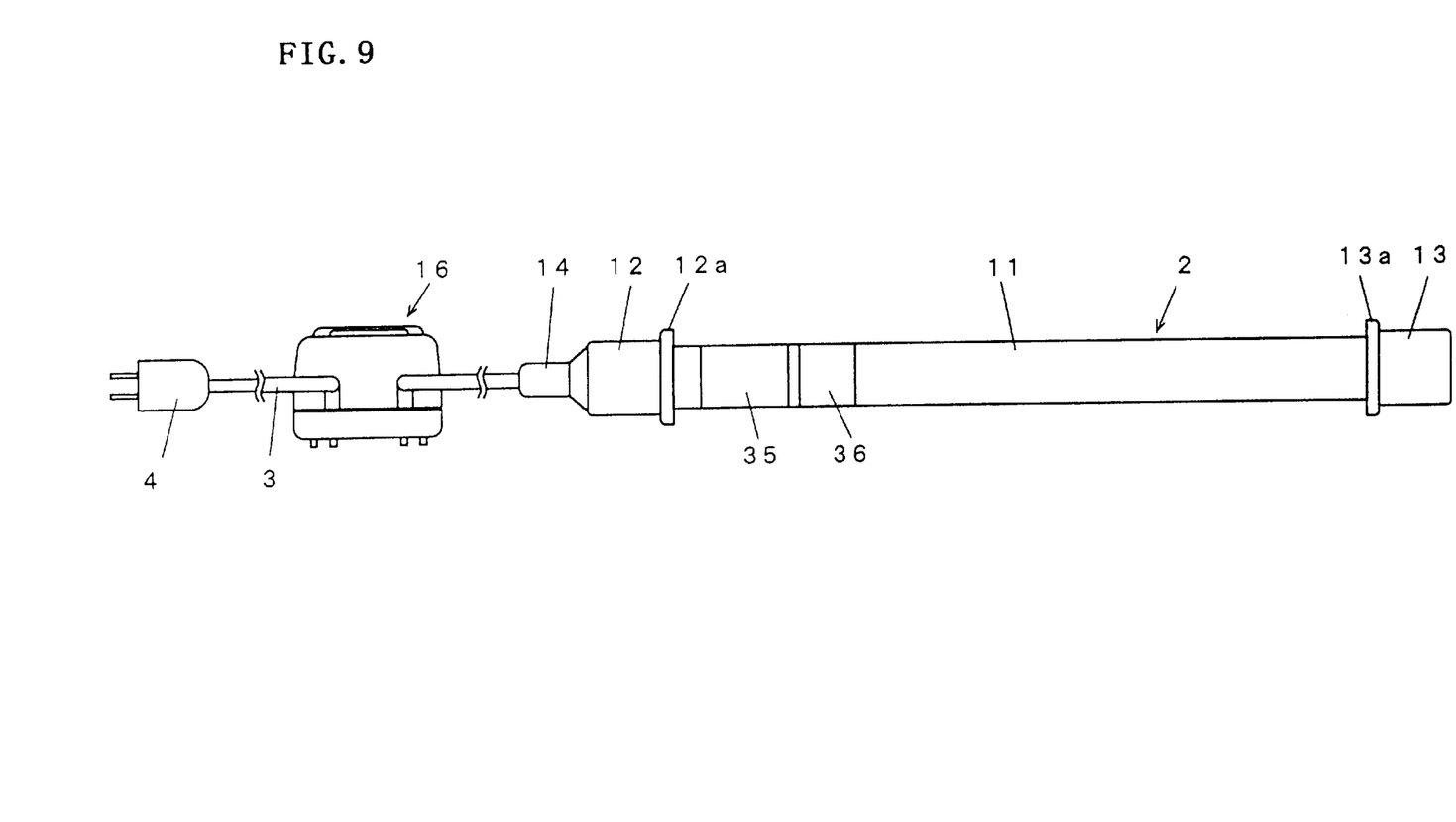
FIG. 9 is a lateral view of an underwater heater according to the fourth embodiment.
Figure 10:
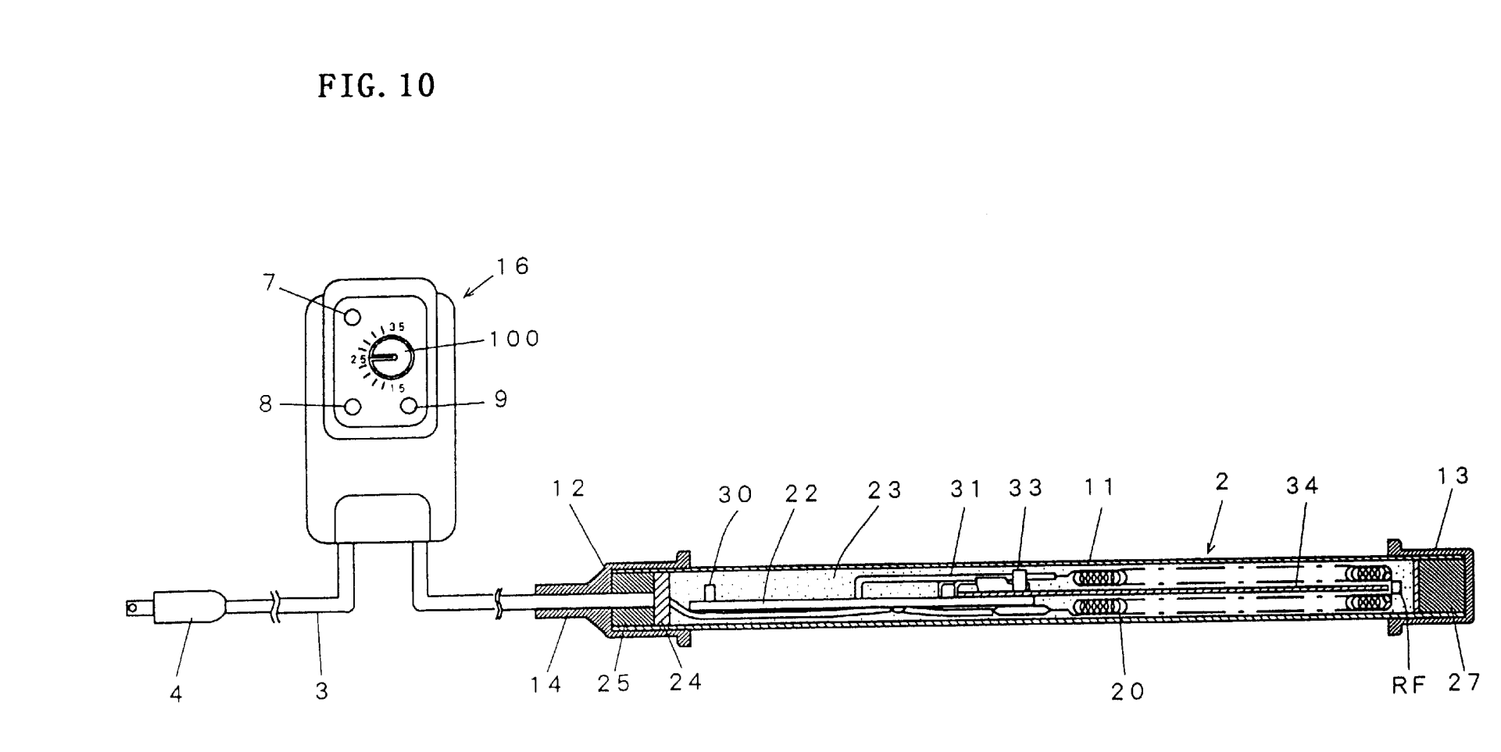
FIG. 10 is a partially exploded front view of the underwater heater according to the fourth embodiment.
Figure 11:
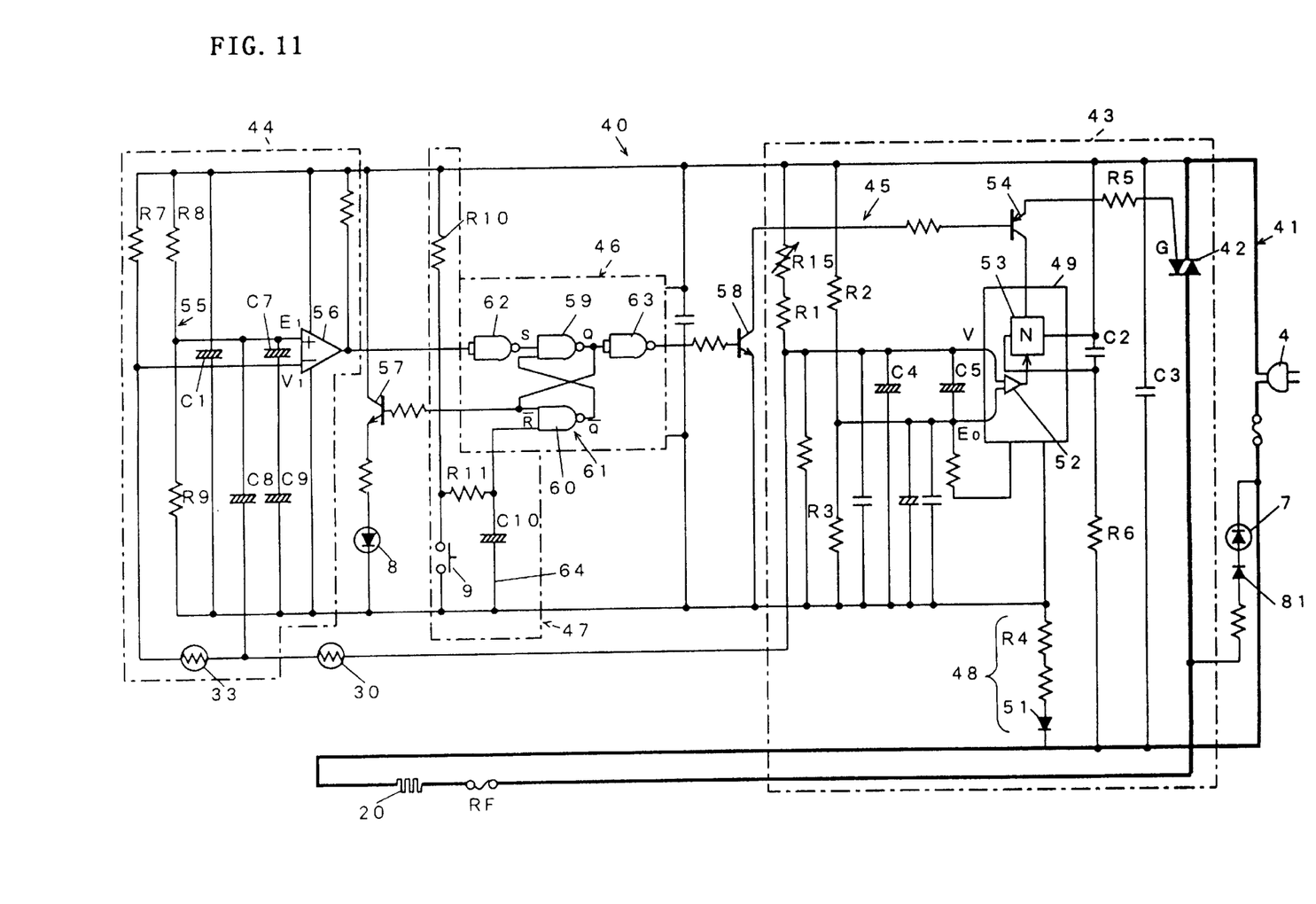
FIG. 11 is a schematic block diagram of an electrical circuit of a control unit of the fourth embodiment.

FIGS. 9 through 11 respectively exemplify the fourth embodiment of the invention. FIGS. 9 and 10 respectively illustrate overall structure of the underwater heater, whereas FIG. 11 represents schematic block diagram of electrical circuits of the control unit 40. In FIGS. 9 through 11, those components identical or corresponding to those which are used for the first through third embodiments are respectively designated by identical reference numerals, and thus, detailed description thereof is omitted.

In FIG. 11, the reference numeral R15 designates a water-temperature-setting variable resistor being connected in series to resistor R1 of the water-temperature control circuit 43. By way of variably setting resistance value of the variable resistor R15 via an operating knob 100 of the controller 16, water temperature inside of the aquarium 1 can be set to an optional degree within a proper temperature range.

In the fourth embodiment, only the heating member 20, thermistors 30 and 33, and temperature fuse RF, are stored in the main heater body 2, whereas majority of components of the control unit 40 including the semiconductor switch 42 are assembled inside of the controller 16 in conjunction with the power-ON display element 7, alarming lamp 8, reset switch 9, and the water-temperature-setting variable resistor R15.

Since the fourth embodiment executes operations for controlling water temperature and detecting abnormality in the same way as was done for the preceding embodiments, description therefor is deleted.

What is claimed is:

1. A heater for immersion in and heating of water in an aquarium, comprising:

a heater housing for submersion in said water:

an electrical heating member in said heater housing;

a power-supply circuit for driving said electrical heating member;

a temperature regulating circuit having a first temperature sensor for sensing a water temperature of said water to maintain said water temperature to within a predetermined water temperature range;

a power control element responsive to said temperature regulating circuit for controlling application of power to said electrical heating member from said power-supply circuit to effect heating by said electrical heating member to maintain said water temperature within a predetermined range;

a second temperature sensor disposed in said heater housing for sensing a housing temperature of said heater housing;

an abnormality-detecting circuit, responsive to said second temperature sensor, for detecting that an abnormal temperature is detected by said second temperature sensor and providing an abnormality detection output indication when said second temperature sensor senses said abnormal temperature;

a drive circuit for overriding control of said power control element by said temperature regulating circuit and placing said power control element in an off state wherein power is not applied to said electrical heating member;

an electronic memory circuit for storing said abnormality detection output and driving said drive circuit such that said drive circuit maintains said power control element in said off state until said memory circuit is reset; and said electronic memory circuit including reset means responsive to an electrical reset signal for resetting said electronic memory circuit.

2. The heater as set forth in claim 1, further comprising a reset switch for sending said electrical reset signal to said electronic memory circuit.

3. The heater according to claim 1 further comprising:

an electric cord and plug for insertion into a power outlet to apply power to said power-supply circuit; and means for applying said electrical reset signal by removing said plug from said power outlet and reinserting said plug into said power outlet.

4. The heater according to claim 3 wherein said electrical reset signal is generated by a series resistor capacitor delay circuit.

5. The heater according to claim 1 further comprising an indicator light which is lit when said electronic memory circuit stores said abnormality detection output.

6. The heater according to claim 1 wherein said electronic memory circuit is an RS flip-flop having an S input and an R input with said electrical reset signal applied to said R input and said abnormality detection output is connected to said S input so as to set said RS flip-flop when an abnormal temperature is detected.

7. The heater according to claim 6 wherein said electrical reset signal is generated by a series resistor capacitor delay circuit having a junction connected to said R input.

8. The heater according to claim 7 wherein said power control element is a solid state AC triode.

9. The heater according to claim 1 wherein said power control element is a solid state AC triode.

\* \* \* \* \*